United States Patent
Yamazaki et al.

(10) Patent No.: US 10,173,917 B2
(45) Date of Patent: Jan. 8, 2019

(54) METHOD FOR PRODUCING GRANULES AND METHOD FOR PRODUCING GLASS PRODUCT

(71) Applicant: ASAHI GLASS COMPANY, LIMITED, Chiyoda-ku (JP)

(72) Inventors: Takeshi Yamazaki, Chiyoda-ku (JP); Terutaka Maehara, Chiyoda-ku (JP); Akiko Kuwayama, Chiyoda-ku (JP)

(73) Assignee: AGC Inc., Chiyoda-ku (JP)

( * ) Notice: Subject to any disclaimer, the term of this patent is extended or adjusted under 35 U.S.C. 154(b) by 0 days.

(21) Appl. No.: 15/219,472

(22) Filed: Jul. 26, 2016

(65) Prior Publication Data
US 2016/0332905 A1 Nov. 17, 2016

Related U.S. Application Data

(63) Continuation of application No. PCT/JP2015/053283, filed on Feb. 5, 2015.

(30) Foreign Application Priority Data

Feb. 6, 2014 (JP) .................................. 2014-021481

(51) Int. Cl.
*C03B 37/005* (2006.01)
*C03B 1/02* (2006.01)
(Continued)

(52) U.S. Cl.
CPC .............. *C03B 37/005* (2013.01); *C03B 1/02* (2013.01); *C03B 3/023* (2013.01); *C03B 17/064* (2013.01);
(Continued)

(58) Field of Classification Search
CPC ......... C03B 3/023; C03B 3/02; C03B 17/064; C03B 18/02; C03B 19/09; C03B 1/02;
(Continued)

(56) References Cited

U.S. PATENT DOCUMENTS 3,753,743 A * 8/1973 Kakuda .................... C03B 1/02
501/31
4,023,976 A * 5/1977 Bauer .................... C03C 1/026
264/117
(Continued)

FOREIGN PATENT DOCUMENTS

JP 54-22457 8/1979
JP 59-156921 9/1984
(Continued)

OTHER PUBLICATIONS

International Search Report dated May 12, 2015 in PCT/JP2015/053283 filed on Feb. 5, 2015.

*Primary Examiner* — Jodi C Franklin
(74) *Attorney, Agent, or Firm* — Oblon, McClelland, Maier & Neustadt, L.L.P.

(57) ABSTRACT

To provide granules for the production of silicate glass, said granules being less likely to adhere even if heated at a high temperature exceeding 800° C. A method for producing granules, which has a step of mixing a glass raw material composition composed essentially of an alkali metal source, an alkaline earth metal source and a powdery silicon source, with water, followed by compression molding, and which is characterized in that the glass raw material composition contains at least 50 mass % of the silicon source, and at least 10 mass % in total of the alkali metal source and the alkaline earth metal source, as calculated as oxides, based on 100 mass % of the silicate glass obtainable from the granules, the alkali metal source contains an alkali metal carbonate, and D90 representing the particle size at a cumulative volume of 90% in the particle size accumulation curve of the alkaline earth metal source is at most 100 μm.

11 Claims, 1 Drawing Sheet

(51) Int. Cl.
    *C03C 3/087* (2006.01)
    *C03B 3/02* (2006.01)
    *C03C 1/02* (2006.01)
    *C03B 17/06* (2006.01)
    *C03B 18/02* (2006.01)
    *C03B 19/09* (2006.01)

(52) U.S. Cl.
    CPC .............. *C03B 18/02* (2013.01); *C03B 19/09* (2013.01); *C03C 1/026* (2013.01); *C03C 3/087* (2013.01); *C03B 2201/20* (2013.01)

(58) Field of Classification Search
    CPC ... C03B 2201/20; C03B 37/005; C03B 3/026; C03B 5/005; C03B 5/0275; C03B 1/00; C03C 3/062; C03C 8/08; C03C 13/06; C03C 1/002; C03C 1/026
    See application file for complete search history.

(56) References Cited

U.S. PATENT DOCUMENTS

| | | | |
|---|---|---|---|
| 5,496,392 A * | 3/1996 | Sims | C03B 3/02 423/DIG. 18 |
| 6,271,159 B1 | 8/2001 | Fairchild et al. | |
| 6,287,378 B1 | 9/2001 | Fairchild et al. | |
| 6,287,997 B1 | 9/2001 | Fairchild et al. | |
| 2003/0052434 A1 | 3/2003 | Hockman et al. | |
| 2005/0022557 A1* | 2/2005 | Carty | C03B 1/02 65/135.9 |
| 2005/0214524 A1* | 9/2005 | Blanchard | C03B 37/14 428/325 |
| 2006/0101856 A1* | 5/2006 | Lehman | C03B 1/00 65/29.11 |
| 2007/0021287 A1 | 1/2007 | Hockman et al. | |
| 2008/0087044 A1* | 4/2008 | Carty | C03B 1/02 65/29.12 |
| 2009/0064716 A1 | 3/2009 | Sakamoto et al. | |
| 2012/0144863 A1 | 6/2012 | Shinohara et al. | |
| 2013/0165553 A1* | 6/2013 | Cuypers | C03B 1/02 524/5 |
| 2013/0247617 A1* | 9/2013 | Shinohara | C03B 1/02 65/66 |
| 2014/0024518 A1* | 1/2014 | Leese | C03C 1/026 501/29 |
| 2014/0130547 A1* | 5/2014 | Shinohara | C03B 1/02 65/29.16 |

FOREIGN PATENT DOCUMENTS

| | | | |
|---|---|---|---|
| JP | 60-168526 | | 9/1985 |
| JP | 60-200831 | | 10/1985 |
| JP | 64-51333 | | 2/1989 |
| JP | 2001-527019 | | 12/2001 |
| JP | 2010-202413 A | | 9/2010 |
| JP | 2014-94841 | | 5/2014 |
| JP | 6015741 B2 | | 10/2016 |
| WO | WO2012/161274 | * | 11/2012 |
| WO | WO 2013/012040 A1 | | 1/2013 |

* cited by examiner

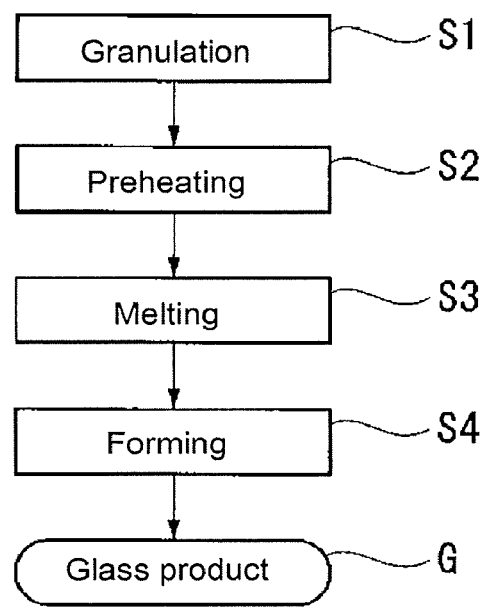

METHOD FOR PRODUCING GRANULES AND METHOD FOR PRODUCING GLASS PRODUCT

TECHNICAL FIELD

The present invention relates to a method for producing granules to be used for the production of silicate glass, and to a method for producing a glass product.

BACKGROUND ART

As a method for increasing energy efficiency at the time of melting glass raw material in a glass melting furnace, a method is known wherein the glass raw material is granulated into briquettes, and the obtained briquettes are preheated or calcined, and then put into a glass melting furnace (see Patent Document 1). At that time, if the granules are preheated by utilizing the high temperature gas discharged from the glass melting furnace, it is possible to effectively utilize the exhaust heat of the glass melting furnace. Patent Document 1 discloses that in order to pre-heat the briquettes to from 650 to 700° C., it is necessary to bring the temperature of the exhaust gas to at least 800° C., and that if briquettes exceed 800° C. locally at the highest temperature zone in the pre-heating device, the briquettes tend to adhere to one another.

As a method for granulating glass raw material for the production of silicate glass, for example, methods disclosed in Patent Documents 2 and 3 are known. Patent Document 2 discloses a method for tumbling granulation in the presence of water by using a relatively coarse grain silica sand having a particle size in a range of from 20 to 100 mesh, and limestone and dolomite of which 50 equivalent % is at most 100 mesh, and adding sodium hydroxide. According to this method, it is disclosed that limestone and dolomite, and sodium hydroxide, are reacted and cured, whereby granules having a high strength is obtainable. In Patent Document 2, a method for producing granules by compression molding is not disclosed.

In Patent Document 3, a method of producing granules (briquettes) by applying pressure to a mixture of glass raw material and a liquid binder, is disclosed. It is disclosed that sand and an alkali metal carbonate (e.g. soda ash) are used as the glass raw material, and an alkali metal silicate solution is used as the liquid binder. In Patent Document 3, there is no disclosure of the particle size of the glass raw material.

PRIOR ART DOCUMENTS

Patent Documents

Patent Document 1: JP-A-60-200831
Patent Document 2: JP-B-54-22457
Patent Document 3: JP-A-59-156921

DISCLOSURE OF INVENTION

Technical Problem

At the time of preheating briquettes by utilizing exhaust gas from a glass melting furnace, there may sometimes be a case where the briquettes locally exceed 800° C. and thus adhere to one another. If the briquettes adhere to one another, flowability will be impaired, whereby a trouble is likely to occur in the process of introducing them into the glass melting furnace. Therefore, Patent Document 1 proposes to provide a mechanism for cooling the exhaust gas.

However, a method for cooling the exhaust gas from the glass melting furnace, brings about a substantial waste of energy and requires to substantially modify the equipment.

It is an object of the present invention to provide granules for the production of silicate glass, which are less likely to adhere to one another even if heated at a high temperature exceeding 800° C.

It is another object to provide a method for producing a glass product having thermal efficiency improved by using the granules which are less likely to adhere to one another even if heated at a high temperature exceeding 800° C.

Solution to Problem

The present invention provides a method for producing granules having the following constructions [1] to [4] and a method for producing a glass product having the following constructions [5] to [10].
[1] A method for producing granules to be used for the production of silicate glass, which has a step of mixing a glass raw material composition composed essentially of an alkali metal source, an alkaline earth metal source and a powdery silicon source, with water, followed by compression molding, and which is characterized in that the glass raw material composition contains at least 50 mass % of the silicon source and at least 10 mass % in total of the alkali metal source and the alkaline earth metal source, as calculated as oxides, based on 100 mass % of the silicate glass obtainable from the granules, the alkali metal source contains an alkali metal carbonate, and D90 representing the particle size at a cumulative volume of 90% in the particle size accumulation curve of the alkaline earth metal source is at most 100 μm.
[2] The method for producing granules according to [1], wherein D50 representing the particle size at a cumulative volume of 50% in the particle size accumulation curve of the silicon source is at most 40 μm.
[3] The method for producing granules according to [1] or [2], wherein the glass raw material composition is raw material for glass having a composition comprising, as represented by mass percentage based on oxides, from 50 to 75% of $SiO_2$, from 0 to 20% of $Al_2O_3$, from 2 to 30% of $MgO+CaO+SrO+BaO$, from 0 to 20% of $Na_2O$, from 0 to 20% of $K_2O$, from 0 to 5% of $Li_2O$, and from 5 to 30% of $Na_2O+K_2O+Li_2O$.
[4] The method for producing granules according to any one of [1] to [3], wherein the compression molded granules have a volume of from 1 to 50 $cm^3$.
[5] A method for producing a glass product, characterized by obtaining granules by the method as defined in any one of [1] to [4], preheating the granules, melting the preheated granules to obtain a glass melt, and forming the glass melt to obtain a glass product.
[6] The method for producing a glass product according to [5], wherein the preheating is conducted by holding the granules at a temperature of at least 750° C.
[7] The method for producing a glass product according to [5] or [6], wherein the preheating is conducted to bring the calcination reaction rate of the granules to at least 60%.
[8] The method for producing a glass product according to any one of [5] to [7], wherein the preheating is conducted by a method of heating by allowing the granules to flow while letting the granules contact with one another.

[9] The method for producing a glass product according to any one of [5] to [7], wherein the preheating is conducted by a method of heating by allowing the granules to stand still.
[10] The method for producing a glass product according to any one of [5] to [7], wherein the preheating is conducted by placing the granules on the top surface of the glass melt, and heating the glass melt so that the preheated granules are melted on the top of the glass melt, to obtain a glass melt.

Advantageous Effects of Invention

According to the present invention, it is possible to obtain granules for the production of silicate glass, which are less likely to adhere to one another even if heated at a high temperature exceeding 800° C.

According to the method for producing a glass product of the present invention, it is possible to suppress adhesion of the granules and to increase the thermal efficiency, in the step of pre-heating prior to melting the granules in the glass melting furnace.

BRIEF DESCRIPTION OF DRAWING

FIG. 1 is a flow diagram illustrating one embodiment of the method for producing a glass product of the present invention.

DESCRIPTION OF EMBODIMENT

In this specification, components of glass are represented by oxides such as $SiO_2$, $Al_2O_3$ and CaO. The contents of the respective components to the entire glass (i.e. the glass composition) are represented by mass percentages based on oxides, on the basis that the mass of glass is 100%.

In this specification, a "glass raw material" is a raw material for a component constituting glass, and a "glass raw material composition" is a composition comprising a plurality of glass raw materials. The glass raw material may, for example, be an oxide or a composite oxide, or a compound capable of becoming an oxide by thermal decomposition. The compound capable of becoming an oxide by thermal decomposition may, for example, be a hydroxide, a carbonate, a nitrate, a sulfate, a halide or the like.

In this specification, "granules" are ones obtained by granulating a glass raw material composition.

In this specification, granules produced by the method of compression molding after mixing the glass raw material composition with water, may be referred to also as "briquettes", in order to distinguish them from granules produced without compression molding.

In this specification, "100 mass % of the silicate glass obtainable from the granules" as used for the entire amount of the composition, is meant for the entire mass of one (the silicate glass) formed by solidification of a glass melt obtained by melting the granules in a case where the glass raw material is composed solely of components of the granules of the present invention. Therefore, components that are processed on a glass product surface by e.g. surface treatment in the post processing step shall not be included in the composition (glass composition) of the glass product.

In this specification, "D50" is the particle size at a cumulative volume of 50% in the particle size accumulation curve. That is, it is the average particle size represented by a 50% diameter in the cumulative fraction. In a case where D50 is at most 1 mm, the 50% diameter in the volume-based cumulative fraction as measured by using a laser diffraction method is taken as D50.

In this specification "D90" is the particle size at a cumulative volume of 90% in the particle size accumulation curve. That is, it is the 90% diameter in the volume-based cumulative fraction as measured by using a laser diffraction method.

As the particle diameter measuring method by a laser diffraction method, the method described in JIS Z8825-1 (2001) is used.

In this specification, the volume and density of the granules can be measured by the Archimedes method by applying a water repellent agent to the granules.

In this specification "to" indicating a numerical value range is used in such a sense that it includes the numerical values described before and after it as the lower limit value and the upper limit value, respectively.

In this specification "preheating" of the glass raw material refers to heating of the glass raw material at a temperature lower than the temperature at which the reaction (i.e. the calcination reaction) for decomposition of a carbonate contained in the glass raw material is completed. The calcination reaction from the glass raw material is usually completed in a temperature range of at most approximately 1000° C.

In this specification "melting" of the glass raw material refers to heating and liquefying the glass raw material. The glass raw material will be melted after the calcination reaction is completed.

Now, the method for producing granules and the method for producing a glass product, of the present invention, will be described in detail.

<<Method for Producing Granules>>

The method for producing granules of the present invention has a step of mixing the glass raw material composition with water, followed by compression molding.

The amount of water to be mixed is preferably from 1 to 10 mass %, more preferably from 3 to 8 mass %, relative to 100 mass % of the glass raw material composition. If the amount of water relative to the glass raw material composition is inadequate, it becomes difficult to obtain strong granules. If the amount of water relative to the glass raw material composition is excessive, during the mixing, the mixture tends to adhere to the surface of the device such as a mixer.

At the time of mixing the glass raw material composition with water, a binding aid may be added. As the binding aid, sodium silicate (water glass), clay mineral or the like may be preferably used.

In the case of using a binding aid, its amount is preferably at most 5 mass % relative to 100 mass % of the glass raw material composition.

<Glass Raw Material Composition>

In the present invention, the glass raw material composition is composed essentially of an alkali metal source, an alkaline earth metal source and a silicon source.

[Silicon Source]

As the silicon source, a known one may suitably be used. In the present invention, at least a powdery silicon source is used. As a powdery silicon source, silica, feldspar or the like may be mentioned. As silica, silica sand, quartz, cristobalite, amorphous silica or the like may be used. Among them, silica sand is preferred in that it is easy to get a raw material of good quality. As the silicon source, two or more types may be used as suitably mixed.

D50 representing the particle size at a cumulative volume of 50% in the particle size accumulation curve of the silicon source is preferably at most 40 μm. When D50 is at most 40 μm, it is readily possible to obtain granules which are less likely to adhere even if heated at a high temperature exceeding 800° C., preferably granules which are less likely to adhere even if heated at a high temperature exceeding 850° C. D50 of the silicon source is more preferably at most 35 μm.

D50 of the silicon source is preferably at least 1 μm, more preferably at least 5 μm, in order to prevent scattering of the glass raw material and to improve the operation efficiency.

D90 representing the particle size at a cumulative volume of 90% in the particle size accumulation curve of the silicon source is preferably at most 75 μm. The lower limit for D90 of the silicon source is preferably at least 5 μm, more preferably at least 13 μm.

The content of the silicon source in the glass raw material composition will be described later.

In the present invention, both an alkali metal source and an alkaline earth metal source are used as glass raw materials.

[Alkaline Earth Metal Source]

The alkaline earth metal in the present invention refers to Mg, Ca, Ba or Sr. The alkaline earth metal source is a compound capable of becoming MgO, CaO, BaO or SrO in the production step for molten glass. The alkaline earth metal source may, for example, be carbonates, sulfates, nitrates, oxides, hydroxides, chlorides and fluorides, of alkaline earth metals. One of them may be used alone, or two or more of them may be used in combination.

Further, dolomite or calcined dolomite may also be used.

In the present invention, as the alkaline earth metal source, it is preferred to use an alkaline earth metal oxide or an alkaline earth metal carbonate. It is more preferred to use an alkaline earth metal carbonate, and it is particularly preferred to use dolomite or calcium carbonate (limestone) in view of production costs.

D90 representing the particle size at a cumulative volume of 90% of the particle size accumulation curve of the alkaline earth metal source is at most 100 μm. When it is at most 100 μm, it is possible to obtain granules which are less likely to adhere even if heated at a high temperature exceeding 800° C. D90 of the alkaline earth metal source is preferably at most 80 μm, more preferably at most 75 μm.

The lower limit value for D90 of the alkaline earth metal source is preferably at least 1 μm, more preferably at least 5 μm, with a view to preventing scattering of the raw material.

The content of the alkaline earth metal source in the glass raw material composition will be described later.

[Alkali Metal Source]

The alkali metal in the present invention refers to Na, K or Li. The alkali metal source is a compound capable of becoming $Na_2O$, $K_2O$ or $Li_2O$ in the production step for molten glass. The alkali metal source may, for example, be carbonates, sulfates, nitrates, oxides, hydroxides, chlorides and fluorides of alkali metals. One of them may be used alone, or two or more of them may be used in combination. A sulfate, chloride or fluoride of an alkali metal serves also as a fining agent.

The content of the alkali metal source in the glass raw material composition will be described later.

[Aluminum Source]

The aluminum source is a compound capable of becoming an $Al_2O_3$ component in the production step for molten glass. As the aluminum source, aluminum oxide, aluminum hydroxide, feldspar or the like is preferably used. One of them may be used alone, or two or more of them may be used in combination.

[Other Glass Raw Materials]

The glass raw material composition may further contain a boron source such as boric acid or boron oxide, a zirconium source such as zirconium oxide, etc. Further, the glass raw material composition may contain a component which serves as a refining agent or color tone adjusting agent for glass. The component which serves as a refining agent or color tone adjusting agent may, for example, be a chloride component such as sodium chloride, magnesium chloride, potassium chloride, calcium chloride or strontium chloride; a sulfate component such as sodium sulfate, magnesium sulfate, potassium sulfate or calcium sulfate; a nitrate component such as sodium nitrate, magnesium nitrate, potassium nitrate or calcium nitrate; fluorite ($CaF_2$), tin oxide (SnO, $SnO_2$), antimony oxide ($Sb_2O_3$), red iron ($Fe_2O_3$), titanium oxide ($TiO_2$), cerium oxide ($CeO_2$), cobalt oxide (CoO), chromium (III) oxide ($Cr_2O_3$), or selenium. One of them may be used alone, or two or more of them may be used in combination.

Further, within a range not to impair the effects of the present invention, compounds known as glass raw materials may be contained in the glass raw material composition.

[Composition of Glass Raw Material Composition]

The composition of the glass raw material composition is adjusted to be substantially the same as the composition of a desired glass product, as calculated as oxides, except for components volatile in the glass melting step.

The glass raw material composition comprises at least 50 mass % of the silicon source and at least 10 mass % in total of the alkali metal source and the alkaline earth metal source, as calculated as oxides, based on 100 mass % of the silicate glass obtainable from the granules. That is, in the composition of the glass raw material composition (as represented by oxides), $SiO_2$ is at least 50 mass %, and the sum of alkali metal oxides and alkaline earth metal oxides is at least 10 mass %.

In the composition of the glass raw material composition, when $SiO_2$ is at least 50 mass %, a problem of adhesion of the granules to one another at the time of preheating the granules is less likely to occur. Further, chemical durability of a silicate glass obtainable from the granules will be excellent. $SiO_2$ in the composition of the glass raw material composition is preferably at least 60 mass %. The upper limit for $SiO_2$ in the composition of the glass raw material composition is at most 90 mass %, preferably at most 80 mass %. When the upper limit for $SiO_2$ is at most 90 mass %, granules having high strength can easily be obtained.

When the glass raw material composition contains at least 10 mass % in total of the alkali metal source and the alkaline earth metal source, on the basis of oxides, based on 100 mass % of the silicate glass obtainable from the granules, granules having high strength can be easily obtained. In particular, at least 20 mass % is preferred from the viewpoint of excellent effect to lower the operation temperature in each step by lowering the viscosity of molten glass obtainable from the granules.

In the composition of the glass raw material composition, the upper limit for the sum of alkali metal oxides and alkaline earth metal oxides is at most 50 mass %, preferably at most 40 mass %, more preferably at most 30 mass %. When the sum of alkali metal oxides and alkaline earth metal oxides is at most 50 mass %, a problem of adhesion of the granules to one another at the time of preheating the granules is less likely to occur.

In the composition of the glass raw material composition, the sum of alkaline earth metal oxides (i.e. MgO+CaO+

SrO+BaO) is preferably from 2 to 30 mass %, more preferably from 4 to 23 mass %, further preferably from 19 to 21 mass %.

Further, in the composition of the glass raw material composition, the sum of alkali metal oxides (i.e. $Na_2O+K_2O+Li_2O$) is preferably from 5 to 30 mass %, more preferably from 7 to 25 mass %, further preferably from 10 to 20 mass %.

In the present invention, an alkali metal carbonate is used at least as a part of the alkali metal source. In particular, sodium carbonate (soda ash) is preferred from the viewpoint of handling efficiency.

The content of the alkali metal carbonate in the glass raw material composition is preferably from 5 to 20 mass %, as calculated as alkali metal oxides, based on 100 mass % of glass obtainable from the granules. When the content of the alkali metal carbonate as calculated as alkali metal oxides is at least 5 mass %, it is possible to lower the melting temperature, and when it is at most 20 mass %, the chemical durability of glass to be obtained will be improved.

The proportion of the alkali metal carbonate in the entire alkali metal source is preferably more than 50 mass %, more preferably at least 80 mass %, as calculated as alkali metal oxides.

An example of the silicate glass obtainable from the glass raw material composition may, for example, be a silicate glass having a composition comprising, as represented by mass percentage based on oxides, from 50 to 75% of $SiO_2$, from 0 to 20% of $Al_2O_3$, from 2 to 30% of MgO+CaO+SrO+BaO, from 0 to 20% of $Na_2O$, from 0 to 20% of $K_2O$, from 0 to 5% of $Li_2O$, and from 5 to 30% of $Na_2O+K_2O+Li_2O$.

The glass raw material composition may additionally contain a small amount of a non-metal oxide (such as sulfur oxide) or a halogen. The total amount of the non-metal oxide and the halogen is preferably from 0 to 1 mass %, based on 100 mass % of the silicate glass obtainable from the granules. The sulfur oxide or the halogen is easily volatile in the glass melting step, and therefore, it is preferred to incorporate it in a sufficient amount to the glass composition in consideration of the melting conditions, etc.

Further, as a colorant, as represented by mass percentage based on oxides, from 0 to 10% of $Fe_2O_3$, from 0 to 10% of $TiO_2$, from 0 to 10% of $CeO_2$, from 0 to 10% of CoO, from 0 to 10% of $Cr_2O_3$, from 0 to 1% of Se, etc., may be contained. A more preferred content of such a colorant is from 0 to 5% of $Fe_2O_3$, from 0 to 5% of $TiO_2$, from 0 to 3% of $CeO_2$, from 0 to 1% of CoO, from 0 to 1% of $Cr_2O_3$, or from 0 to 1% of Se. The total content of these colorants is preferably at most 10%, more preferably at most 5%.

The glass raw material composition preferably contains substantially no or little amount of sodium hydroxide.

If the glass raw material composition contains sodium hydroxide, a mixer to be used for mixing the raw material or a molding machine is likely to be corroded in the step of granulating the glass raw material composition. Specifically, the content of sodium hydroxide is preferably at most 1 mass %, more preferably 0 mass %, based on 100 mass % of the glass raw material composition. In this specification, 0 mass % means that the content is below the detection limit.

<Step for Granulating Glass Raw Material Composition>

In the present invention, the step for producing granules by mixing the glass raw material composition with water, followed by compression molding, can be conducted by suitably using a known technique.

It is preferred to firstly mix the glass raw material composition, and add and mix thereto water, or water and a binding aid, followed by compression molding of the obtained mixture.

Mixing the glass raw material composition is preferably carried out to such an extent that the glass raw material composition becomes sufficiently homogeneous.

As a method of adding water, or water and a binding aid, to the glass raw material composition, a method of spraying onto the glass raw material composition is preferred. Spraying onto the glass raw material composition may be applied to the glass raw material composition during the mixing, or may be applied to the glass raw material composition at rest.

As the apparatus for compression molding, a known apparatus, such as a tableting machine, an extrusion molding machine or a roll-type compression granulator, may suitably be used.

A roll-type compression granulator is, generally, provided with roll with holes equipped a semi-circular groove shape holes to constitute a mold for molding into a briquette shape, a hopper to introduce the raw material between the two rolls, a feeder to push the raw material into the roll space, a housing to support them, a motor to drive the rolls and feeder, etc. By pushing the raw material into the roll space between the rotating hole-type rolls to let it be compressed between the rolls, granules (briquettes) will be obtained as a molded product.

Briquettes produced by the compression molding contain water, and therefore, they may be dried. The temperature at the time of drying the granules is preferably at most 200° C., more preferably at most 150° C., and from the viewpoint of operation efficiency, further preferably from 100 to 120° C. The obtained granules may be sieved, as the case requires.

<Granules>

Granules obtainable by the production method of the present invention are granules to be used for the production of silicate glass. The granules of the present invention is composed essentially of the silicon source, the alkali metal carbonate and the alkaline earth metal source.

The composition of the granules is adjusted so that the desired glass composition would be obtainable when they are vitrified by heating and melting them.

The composition of the granules, as calculated as oxides, is substantially equal to the composition of the silicate glass obtainable from the granules excluding the fining agent component and water. In a case where $B_2O_3$ is to be contained in the silicate glass obtainable from granules, in consideration of the volatilization in the melting step, the amount as calculated as $B_2O_3$ of e.g. boric acid in granules is preferably adjusted to be larger than the $B_2O_3$ content in the glass composition. Even in a case where no $B_2O_3$ is to be contained in silicate glass obtainable from granules, boric acid may be contained in the granules so long as it evaporates off in the melting step.

The shape of the granules of the present invention may, for example, be a sphere, cylinder, cuboid, ellipsoid, substantially almond-shaped, or the like, and the shape is not particularly limited. The volume of the compression molded granules (briquettes) is preferably from 0.5 to 100 cm³, more preferably from 1 to 50 cm³, further preferably from 3 to 50 cm³. When this volume is at least the lower limit value in the above range, granules can be easily molded by a common briquette machine, and when it is at most the upper limit value, preheating will be easy.

The density of the granules is preferably from 1.5 to 2.5 (g/cm³), more preferably from 1.9 to 2.1 (g/cm³).

According to the invention, in granules (briquettes) obtained by compression molding the glass raw material composition composed essentially of the alkali metal carbonate, the alkaline earth metal source and the powdery silicon source, by adjusting D90 of the alkaline earth metal source to be at most 100 μm, preferably at most 80 μm, it is possible to prevent adhesion of granules to one another even when heated at a high temperature. Specifically, as shown in Examples given hereinafter, even when the heating temperature of granules (i.e. the preheating temperature) is at least 800° C., preferably at least 850° C., it is possible to prevent adhesion of granules to one another.

The reason for this effect is considered to be such that when the briquettes are preheated, the alkaline earth metal source in the briquettes dissolves at a lower temperature than the silicic acid source, whereby pores enclosing the low melting point liquid will be formed at portions where the alkaline earth metal source is present. If the particle size of the alkaline earth metal source is large, large pores will be formed, whereby the low melting point melt present in the pores tends to easily ooze out, and tends to adhere to other briquettes. When D90 of the alkaline earth metal source is in the above range, the pores to be formed tend to be small, whereby oozing out tends to be less likely to occur, and thus, it is considered possible to preheat the briquettes to a higher temperature without adhesion of the briquettes to one another.

Further, by adjusting D50 of the silicon source to be at most 40 μm, adhesion of granules to one another tends to be less likely to occur when they are heated at a high temperature.

The reason for this effect is considered to be such that when the briquettes are preheated, the alkali metal carbonate forms a melt at a temperature lower than the silicon source, but, if the particle size of the silicon source is small, the silicon source adheres around the alkali metal carbonate, whereby the melt will not ooze out. However, if the particle size of the silicon source is large, the silicon source will not adhere around the alkali metal carbonate, whereby the melt is considered to ooze out at the time of preheating.

Granules obtainable by the method of the present invention contain an alkali metal carbonate, whereby when they are heated, the reaction of such a carbonate to have carbon dioxide gas desorbed by decomposition occurs. This reaction is accompanied by heat absorption and tends to easily proceed as the heating temperature is higher.

With granules obtainable by the method of the present invention, adhesion of granules to one another is less likely to occur even if heated at a high temperature of at least 800° C., and therefore, it is possible to let the reaction for desorption of carbon dioxide gas sufficiently proceed by increasing the preheating temperature of the granules. It is thereby possible to reduce the residual amount of the carbonate in the granules to be supplied to the glass melting furnace, and to suppress the desorption of carbon dioxide gas to be generated in the glass melting furnace, whereby it is possible to improve the thermal efficiency.

<<Method for Producing Glass Product>>

The method for producing a glass product of the present invention is a method for producing a glass product, which comprises obtaining granules by the method for producing granules of the present invention, preheating the granules, melting the preheated granules to obtain a glass melt, and forming the glass melt to obtain a glass product. As the glass product, a glass plate, a glass substrate, a glass container, a glass film, a glass tube, glass fibers, glass flakes, glass particles, etc. may be exemplified.

FIG. 1 is a flow diagram illustrating one embodiment of the method for producing a glass product of the present invention. Reference symbol S1 is a granulation step of the glass raw material and is a step of obtaining granules by the method for producing granules of the present invention.

Then, the obtained granules are preheated in preheating step S2 to terminate the calcination reaction, and in melting step S3, a glass melt is obtained. Thereafter, in forming step S4, the glass melt is formed into a desired shape, followed by slow cooling, etc. to obtain a glass product G. In preheating step S2, in a case where the granules are preheated at the top layer of the glass melt in the glass melting furnace, the calcination reaction may occur in the glass melting furnace.

<Preheating Step>

The preheating step is preferably conducted by a method of heating by allowing the granules of the present invention to flow while letting them contact with one another (preheating method (a)). By letting the granules contact with one another, it is possible to reduce emission of heat from the granules thereby to improve the thermal efficiency. By preheating granules by allowing them to flow, transportation from the preheating step to the melting step is easily done continuously, whereby it is possible to reduce the loss of heat. The granules of the present invention are less likely to adhere even if preheated at a high temperature in contact with one another.

For example, the method may be such that while filling the granules into a preheater and allowing them to flow therein, the preheater is heated by utilizing a high temperature exhaust gas, etc.

Or, the preheating step may be conducted by a method of heating by allowing the granules of the present invention to stand still (preheating method (b)). By preheating the granules by allowing them to stand still, it is possible to reduce the emission of heat from the granules and to improve the thermal efficiency. The granules of the present invention are less likely to adhere even if preheated at a high temperature while being allowed to stand still.

For example, the method may be such that the granules are filled in a preheater, and a high temperature exhaust gas is passed through spaces among the filled granules.

Or, the preheating step may be conducted by a method wherein the granules of the present invention are disposed on the top surface of glass melt, and the glass melt is heated (preheating method (c)). The preheated granules will be melted at the top of the glass melt, whereby glass melt will be obtained. For example, the granules of the present invention may be introduced into an electric melting furnace of cold-top system as disclosed in JP-A-3-252319 and preheated on molten glass. In such a case, the pre-heated granules will be gradually melted from the bottom to form molten glass. According to the cold-top system, diffusion of heat from the glass melt is suppressed and also volatilization of components from the molten glass is suppressed, whereby it is possible to suppress variation of the glass composition in the melting step.

In the cold-top system, a semi-molten layer is formed between the upper low temperature glass raw material layer and the lower high temperature glass melt, and if a gas is accumulated in the semi-molten layer, there may be a problem such as rupturing of the semi-molted layer. However, the granules of the present invention are less likely to adhere even if heated at a high temperature of at least 800° C., and therefore, carbon dioxide gas generated by the calcination reaction from the granules is likely to evaporate from spaces among the granules. When the granules of the present invention are used, it is possible to prevent such a phenomenon that a gas accumulates in the semi-molten layer.

As another method for the preheating step, a method may be mentioned wherein in a glass melting furnace, the granules are preheated at the top layer of glass melt by the ambient temperature in the glass melting furnace and by heat from below the glass melt.

The concepts of the respective methods for the preheating step as described above may be utilized alone, but may be utilized in combination.

The preheating temperature is preferably at least 500° C., more preferably at least 600° C., in order to let the reaction to eliminate carbon dioxide gas generated by the calcination reaction proceed sufficiently, before the granules are fed to a glass melting furnace. In order to further increase the thermal efficiency at the time of melting the granules in a glass melting furnace, the preheating temperature is further preferably at least 750° C., particularly preferably at least 800° C.

With respect to the upper limit of the preheating temperature, with a view to preventing adhesion of the granules to one another, it is preferred to adjust the temperature of the exhaust gas in contact with the granules to be at most 900° C. and accordingly, adjustment of the temperature of the exhaust gas is carried out as the case requires. The preheating step is preferably carried out by holding the granules of the present invention to be at least 750° C., more preferably carried out by holding them to be at from 750 to 900° C.

In the case of performing the preheating of the granules in a glass melting furnace, the temperature of the granules may become 900° C. or higher by the atmosphere in the glass melting furnace and the thermal energy from the glass melt.

The calcination rate by preheating is preferably at least 60%, more preferably at least 65%, further preferably at least 70%, particularly preferably at least 80%.

The calcination reaction rate can be obtained by the following formula (1) from the mass a of the granules before preheating, the mass b of the granules after preheating, and the mass c of glass obtainable from the granules.

$$\text{Calcination reaction rate} = (1-b/a)/(1-c/a) \tag{1}$$

For example, when the glass melting furnace is either a regenerator furnace or an oxygen combustion furnace, a gas exhausted from the flue can be utilized as an exhaust gas to be introduced into the preheater. In the oxygen combustion furnace, it is possible to lower the temperature of the exhaust gas to be at most 900° C. by a method of diluting the exhaust gas by mixing with air or by passing the exhaust gas through a heat exchanger. In the regenerator furnace, a part of exhaust gas to be passed through the normal regenerator is suctioned and this high temperature exhaust gas may be utilized, or it is also possible to utilize exhaust gas after being passed through the regenerator.

<Melting Step>

The melting step is a step of heating and melting the granules.

The method for melting granules in the melting step is not particularly limited, and a known method for melting glass raw materials may be applied. Melting of the granules is preferably conducted by a common melting method using a glass melting Siemens type furnace or pot type furnace. It may be melting by the above-mentioned cold top system.

In a case where a large quantity of glass is produced by using a large-sized apparatus, in the melting step, the granules and cullet obtained by crushing glass plates, etc., may be mixed and melted. Such cullet is preferably one having a glass composition equal to glass melt obtainable from the granules of the present invention. Specifically, it is preferred to use cullet of a glass product obtained by using the granules of the present invention, or cullet produced in a step of producing the glass product.

<Forming Step>

The glass melt obtained in the glass melting furnace is formed into a desired shape, to obtain a glass product. Then, it is slowly cooled and may be subjected to a known post treatment such as cutting, polishing or surface treatment. In a case where the glass product is a plate shape product, the forming step may be conducted by a known method such as a float process, a down draw method or a fusion method. A float process is a method of forming the glass melt into a plate shape on molten tin.

<Glass Product>

The glass product of the present invention is meant for one obtained by melting the granules in the melting step, followed by forming and then by slow cooling to have a desired shape. The shape of the glass product may, for example, be flat, curved, cylindrical, container-form or the like. Further, the glass product may be one subjected to surface treatment in a step after the melting step, or after being formed into a glass product.

According to the method for producing a glass product of the present invention, by preheating the granules in a state less likely to adhere, it is possible to improve the thermal efficiency in the glass melting furnace.

Further, it is possible to effectively utilize a hot exhaust gas from the glass melting furnace.

Still further, by preheating the granules, it is possible to let the elimination reaction of carbon dioxide gas take place before the granules are fed into the glass melting furnace.

EXAMPLES

Now, the present invention will be described in further detail with reference to Examples, but it should be understood that the present invention is not limited to these Examples.

Ex. 1 to 11

Ex. 1 to 4 are Comparative Examples, and Ex. 5 to 11 are Examples of the present invention.

Using the glass raw materials shown in Table 1, briquettes were produced with the formulation shown in Table 2. The glass composition of the silicate glass obtained from briquettes in each Example is shown in Table 3. Table 4 shows the combination of silica sand and dolomite in the formulation of each Example.

Preliminarily, sodium metasilicate was diluted with hot water (part of the water to be blended) at 60° C., to prepare a sodium metasilicate solution. The mass ratio of sodium metasilicate to hot water was 2:3.

Into a mixer provided with a revolving/rotating screw inside an inverted cone-shaped mixing vessel, glass raw material other than the sodium metasilicate solution, and water, were put and mixed for two minutes, and then, while continuing the mixing, the sodium metasilicate solution was added over a period of about 8 minutes by spraying and further mixed for 1 minute.

The obtained mixture at room temperature was compression-molded by using a roll-type compression granulator and dried by heating at 120° C. for 12 hours to obtain briquettes.

The obtained briquettes each had a substantially almond shape with 29 mm in length, 18 mm in width and 13 mm in thickness, and had a volume of 3.1 cm$^3$ and a density of 1.8 g/cm$^3$.

With respect to briquettes obtained in each Example, the presence or absence of adhesion of the briquettes to one another by preheating, and the reaction rate of the calcination reaction by preheating, were evaluated by the following methods. The evaluations were conducted by changing the preheating temperature to be 750° C., 800° C. and 850° C. The results are shown in Tables 5 to 10.

<Evaluation Methods>
[Presence or Absence of Adhesion of Briquettes to One Another by Preheating]

50 g of briquettes at room temperature were put into a quartz beaker with a diameter of 50 mm and a height of 60 mm, and heated by using an electric furnace, at a temperature-raising rate of 5° C./min to a predetermined preheating temperature (750° C., 800° C., 850° C.), and after holding them for 3 hours at that preheating temperature, they were taken out. By picking up the briquettes in the quartz beaker with tweezers, the presence or absence of adhesion of the briquettes to one another was visually observed.

[Calcination Reaction Rate by Preheating]

In the above evaluation method of the "presence or absence of adhesion of briquettes to one another by preheating", the mass (a) of the briquettes in the quartz beaker before heating and the mass (b) of the briquettes in the quartz beaker after heating were respectively measured, and from the mass (c) of the glass obtained from the granules, the calcination reaction rate (unit: %) was obtained by the above-mentioned formula (1).

As the value of this calcination reaction rate is larger, the elimination of carbon dioxide gas by heating is higher, and the carbonate remaining in the granules is less.

TABLE 1

| Glass raw material | D50 [μm] | D90 [μm] | Composition of glass raw material components (calculated as oxides) [mass %] | | | | | | | | | |
|---|---|---|---|---|---|---|---|---|---|---|---|---|
| | | | $SiO_2$ | $Al_2O_3$ | $Na_2O$ | MgO | CaO | $Fe_2O_3$ | $SO_3$ | $CO_2$ | $H_2O$ | Total |
| Silica sand (1) | 270.4 | 394.2 | 100.0 | 0.0 | 0.0 | 0.0 | 0.0 | 0.0 | 0.0 | 0.0 | 0.0 | 100.0 |
| Silica sand (2) | 50.1 | 80.7 | 100.0 | 0.0 | 0.0 | 0.0 | 0.0 | 0.0 | 0.0 | 0.0 | 0.0 | 100.0 |
| Silica sand (3) | 36.0 | 71.5 | 100.0 | 0.0 | 0.0 | 0.0 | 0.0 | 0.0 | 0.0 | 0.0 | 0.0 | 100.0 |
| Silica sand (4) | 25.0 | 39.2 | 100.0 | 0.0 | 0.0 | 0.0 | 0.0 | 0.0 | 0.0 | 0.0 | 0.0 | 100.0 |
| Aluminum oxide | 62.2 | — | 0.0 | 100.0 | 0.0 | 0.0 | 0.0 | 0.0 | 0.0 | 0.0 | 0.0 | 100.0 |
| Sodium carbonate (soda ash) | 457.0 | — | 0.0 | 0.0 | 58.4 | 0.0 | 0.0 | 0.0 | 0.0 | 41.6 | 0.0 | 100.0 |
| Dolomite (1) | 220.0 | 635.4 | 0.0 | 0.0 | 0.0 | 18.0 | 34.0 | 0.0 | 0.0 | 48.0 | 0.0 | 100.0 |
| Dolomite (2) | 212.6 | 572.9 | 0.0 | 0.0 | 0.0 | 18.0 | 34.0 | 0.0 | 0.0 | 48.0 | 0.0 | 100.0 |
| Dolomite (3) | 27.7 | 78.7 | 0.0 | 0.0 | 0.0 | 18.0 | 34.0 | 0.0 | 0.0 | 48.0 | 0.0 | 100.0 |
| Dolomite (4) | 12.5 | 24.3 | 0.0 | 0.0 | 0.0 | 18.0 | 34.0 | 0.0 | 0.0 | 48.0 | 0.0 | 100.0 |
| Calcium hydroxide (slaked lime) | 229.0 | — | 0.0 | 0.0 | 0.0 | 0.0 | 73.5 | 0.0 | 0.0 | 26.5 | 0.0 | 100.0 |
| Iron(III) oxide (Bengala) | 39.2 | — | 0.0 | 0.0 | 0.0 | 0.0 | 0.0 | 100.0 | 0.0 | 0.0 | 0.0 | 100.0 |
| Sodium sulfate (Glauber's salt) | 228.0 | — | 0.0 | 0.0 | 43.5 | 0.0 | 0.0 | 0.0 | 56.5 | 0.0 | 0.0 | 100.0 |
| Sodium metasilicate (water glass) | — | — | 28.4 | 0.0 | 29.2 | 0.0 | 0.0 | 0.0 | 0.0 | 0.0 | 42.4 | 100.0 |

TABLE 2

| Glass raw material | Blend formulation [mass %] | | | | | | | | | | |
|---|---|---|---|---|---|---|---|---|---|---|---|
| | Ex. 1 | Ex. 2 | Ex. 3 | Ex. 4 | Ex. 5 | Ex. 6 | Ex. 7 | Ex. 8 | Ex. 9 | Ex. 10 | Ex. 11 |
| Silica sand (1) | 60.18 | — | — | — | 60.18 | — | — | — | 60.18 | — | — |
| Silica sand (2) | — | — | — | — | — | 60.18 | — | — | — | — | — |
| Silica sand (3) | — | 60.18 | — | 60.18 | — | — | 60.18 | — | — | 60.18 | — |
| Silica sand (4) | — | — | 60.18 | — | — | — | — | 60.18 | — | — | 60.18 |
| Aluminum oxide | 0.38 | 0.38 | 0.38 | 0.38 | 0.38 | 0.38 | 0.38 | 0.38 | 0.38 | 0.38 | 0.38 |
| Sodium carbonate (soda ash) | 17.74 | 17.74 | 17.74 | 17.74 | 17.74 | 17.74 | 17.74 | 17.74 | 17.74 | 17.74 | 17.74 |
| Dolomite (1) | 18.66 | 18.66 | 18.66 | — | — | — | — | — | — | — | — |
| Dolomite (2) | — | — | — | 18.66 | — | — | — | — | — | — | — |
| Dolomite (3) | — | — | — | — | 18.66 | 18.66 | 18.66 | 18.66 | — | — | — |
| Dolomite (4) | — | — | — | — | — | — | — | — | 18.66 | 18.66 | 18.66 |
| Calcium hydroxide (slaked lime) | 1.54 | 1.54 | 1.54 | 1.54 | 1.54 | 1.54 | 1.54 | 1.54 | 1.54 | 1.54 | 1.54 |
| Iron(III) oxide (Bengala) | 0.06 | 0.06 | 0.06 | 0.06 | 0.06 | 0.06 | 0.06 | 0.06 | 0.06 | 0.06 | 0.06 |
| Sodium sulfate (Glauber's salt) | 0.44 | 0.44 | 0.44 | 0.44 | 0.44 | 0.44 | 0.44 | 0.44 | 0.44 | 0.44 | 0.44 |
| Sodium metasilicate (water glass) | 1.00 | 1.00 | 1.00 | 1.00 | 1.00 | 1.00 | 1.00 | 1.00 | 1.00 | 1.00 | 1.00 |
| Total | 100 | 100 | 100 | 100 | 100 | 100 | 100 | 100 | 100 | 100 | 100 |
| Water | 3.85 | 3.85 | 3.85 | 3.85 | 3.85 | 3.85 | 3.85 | 3.85 | 3.85 | 3.85 | 3.85 |

TABLE 3

Glass composition [mass %]

| | |
|---|---|
| SiO$_2$ | 73.1 |
| Al$_2$O$_3$ | 0.5 |
| Na$_2$O | 13.3 |
| MgO | 4.1 |
| CaO | 9.0 |
| Fe$_2$O$_3$ | 0.1 |
| SO$_3$ | 0.3 |
| Total | 100.0 |

TABLE 4

| Blend | | D90 of dolomite [μm] | | | |
|---|---|---|---|---|---|
| | | 635.4 | 572.9 | 78.7 | 24.3 |
| D50 of silica sand [μm] | 270.4 | Ex. 1 | — | Ex. 5 | Ex. 9 |
| | 50.1 | — | — | Ex. 6 | — |
| | 36.0 | Ex. 2 | Ex. 4 | Ex. 7 | Ex. 10 |
| | 25.0 | Ex. 3 | — | Ex. 8 | Ex. 11 |

TABLE 5

Presence or absence of adhesion of briquettes to one another by preheating

| 750° C. | | D90 of dolomite [μm] | | | |
|---|---|---|---|---|---|
| | | 635.4 | 572.9 | 78.7 | 24.3 |
| D50 of silica sand [μm] | 270.4 | Absent | — | Absent | Absent |
| | 50.1 | — | — | Absent | — |
| | 36.0 | Absent | Absent | Absent | Absent |
| | 25.0 | Absent | — | Absent | Absent |

TABLE 6

Presence or absence of adhesion of briquettes to one another by preheating

| 800° C. | | D90 of dolomite [μm] | | | |
|---|---|---|---|---|---|
| | | 635.4 | 572.9 | 78.7 | 24.3 |
| D50 of silica sand [μm] | 270.4 | Present | — | Absent | Absent |
| | 50.1 | — | — | Absent | — |
| | 36.0 | Present | Present | Absent | Absent |
| | 25.0 | Present | — | Absent | Absent |

TABLE 7

Presence or absence of adhesion of briquettes to one another by preheating

| 850° C. | | D90 of dolomite [μm] | | | |
|---|---|---|---|---|---|
| | | 635.4 | 572.9 | 78.7 | 24.3 |
| D50 of silica sand [μm] | 270.4 | Present | — | Present | Present |
| | 50.1 | — | — | Present | — |
| | 36.0 | Present | Present | Absent | Absent |
| | 25.0 | Present | — | Absent | Absent |

TABLE 8

Calcination reaction rate by preheating [%]

| 750° C. | | D90 of dolomite [μm] | | | |
|---|---|---|---|---|---|
| | | 635.4 | 572.9 | 78.7 | 24.3 |
| D50 of silica sand [μm] | 270.4 | 42.4 | — | 44.3 | 44.0 |
| | 50.1 | — | — | 50.5 | — |
| | 36.0 | 43.9 | 38.9 | 47.8 | 55.6 |
| | 25.0 | 47.2 | — | 53.7 | 55.6 |

TABLE 9

Calcination reaction rate by preheating [%]

| 800° C. | | D90 of dolomite [μm] | | | |
|---|---|---|---|---|---|
| | | 635.4 | 572.9 | 78.7 | 24.3 |
| D50 of silica sand [μm] | 270.4 | 70.0 | — | 69.2 | 69.7 |
| | 50.1 | — | — | 76.5 | — |
| | 36.0 | 69.8 | 62.2 | 65.3 | 71.1 |
| | 25.0 | 72.9 | — | 75.1 | 75.2 |

TABLE 10

Calcination reaction rate by preheating [%]

| 850° C. | | D90 of dolomite [μm] | | | |
|---|---|---|---|---|---|
| | | 635.4 | 572.9 | 78.7 | 24.3 |
| D50 of silica sand [μm] | 270.4 | 95.5 | — | 92.0 | 93.8 |
| | 50.1 | — | — | 93.1 | — |
| | 36.0 | 95.6 | 87.9 | 80.9 | 88.9 |
| | 25.0 | 94.9 | — | 90.4 | 90.4 |

In Tables 5 to 7, symbol "-" means that no experiment was conducted.

As shown in the results in Table 5, when the preheating temperature was 750° C., no adhesion of briquettes to one another was observed in any of Examples 1 to 11.

Further, as shown in the results in Table 6, when the preheating temperature was 800° C., adhesion of briquettes to one another was observed in Examples 1 to 4, but in Examples 5 to 11 wherein D90 of dolomite was at most 100 μm, no adhesion of briquettes was observed.

Further, as shown in the results in Table 7, when the preheating temperature was 850° C., adhesion of briquettes to one another was prevented in Examples 7, 8, 10 and 11 wherein D90 of dolomite was at most 100 μm and D50 of silica sand was at most 40 μm.

Further, as shown in the results in Tables 8 to 10, the higher the preheating temperature is, the higher the calcination reaction rate becomes.

Further, as shown in the results in Table 9, when the preheating temperature was 800° C., a good calcination reaction rate of at least 65% was obtained in Example 5 toll wherein no adhesion was observed among briquettes.

Further, as shown in the results in Table 10, when the preheating temperature was 850° C., an excellent calcination reaction rate of at least 80% was obtained in Examples 7, 8, 10 and 11 wherein no adhesion was observed among briquettes.

INDUSTRIAL APPLICABILITY

According to the present invention, it is possible to obtain granules for the production of silicate glass, which are less likely to adhere even if heated at a high temperature exceeding 800° C. Further, according to the method for producing a glass product of the present invention, in the step of preheating granules prior to melting them in a glass melting furnace, it is possible to suppress adhesion of the granules and to increase the thermal efficiency, and thus, the method is useful in the production of silicate glass.

This application is a continuation of PCT Application No. PCT/JP2015/053283, filed on Feb. 5, 2015, which is based upon and claims the benefit of priority from Japanese Patent Application No. 2014-021481 filed on Feb. 6, 2014. The contents of those applications are incorporated herein by reference in their entireties.

REFERENCE SYMBOLS

S1: glass raw material granulation step
S2: preheating step
S3: melting step
S4: forming step
G: glass product

What is claimed is:

1. A method for producing briquettes, the method comprising:
    mixing components which comprises:
        a glass raw material composition comprising an alkali metal source, an alkaline earth metal source and a powdery silicon source;
        water; and
        optionally a binding aid which is at least one selected from the group consisting of a sodium silicate and a clay mineral; and
    conducting compression molding of the mixed components to produce compression molded briquettes,
    wherein
    the glass raw material composition comprises at least 50 mass % of the silicon source and at least 10 mass % in total of the alkali metal source and the alkaline earth metal source, as calculated as oxides, based on 100 mass % of the glass raw material composition,
    the alkali metal source comprises an alkali metal carbonate,
    D90 representing the particle size at a cumulative volume of 90% in the particle size accumulation curve of the alkaline earth metal source is at most 100 μm,
    an amount of water in the compression molded briquettes is from 3 to 8 mass %,
    the glass material composition does not comprise boron, and
    the compression molded briquettes have a volume of from 1 to 50 cm$^3$.

2. The method for producing briquettes according to claim 1, wherein D50 representing the particle size at a cumulative volume of 50% in the particle size accumulation curve of the silicon source is at most 40 μm.

3. The method for producing briquettes according to claim 1, wherein the glass raw material composition is raw material for glass having a composition comprising, as represented by mass percentage based on oxides, from 50 to 75% of SiO$_2$, from 0 to 20% of Al$_2$O$_3$, from 2 to 30% of MgO+CaO+SrO+BaO, from 0 to 20% of Na$_2$O, from 0 to 20% of K$_2$O, from 0 to 5% of Li$_2$O, and from 5 to 30% of Na$_2$O+K$_2$O+Li$_2$O.

4. A method for producing a glass product, comprising:
    obtaining briquettes by the method according to claim 1;
    preheating the briquettes;
    melting the preheated briquettes to obtain a glass melt; and
    forming the glass melt to obtain a glass product.

5. The method for producing a glass product according to claim 4, wherein the preheating is conducted by holding the briquettes at a temperature of at least 750° C.

6. The method for producing a glass product according to claim 4, wherein the preheating is conducted to bring the calcination reaction rate of the briquettes to at least 60%.

7. The method for producing a glass product according to claim 4, wherein the preheating is conducted by a method of heating by allowing the briquettes to flow while letting the briquettes contact with one another.

8. The method for producing a glass product according to claim 4, wherein the preheating is conducted by a method of heating by allowing the briquettes to stand still.

9. The method for producing a glass product according to claim 4, wherein the preheating is conducted by placing the briquettes on the top surface of the glass melt, and heating the glass melt so that the preheated briquettes are melted on the top of the glass melt, to obtain a glass melt.

10. The method for producing briquettes according to claim 1, wherein a content of sodium hydroxide in the glass raw material is 0 mass %.

11. The method for producing briquettes according to claim 1, the compression molding is conducted using a roll compression granulator.

* * * * *